July 20, 1943.  H. D. STEVENS  2,324,985
APPARATUS FOR TIRE PRODUCTION
Filed July 27, 1940  9 Sheets-Sheet 1

INVENTOR
Horace D. Stevens
BY Ely & Frye
ATTORNEYS

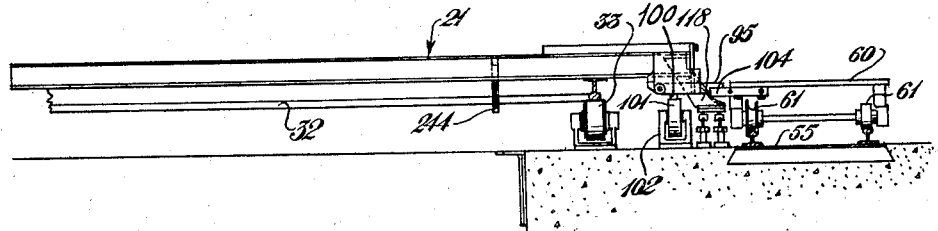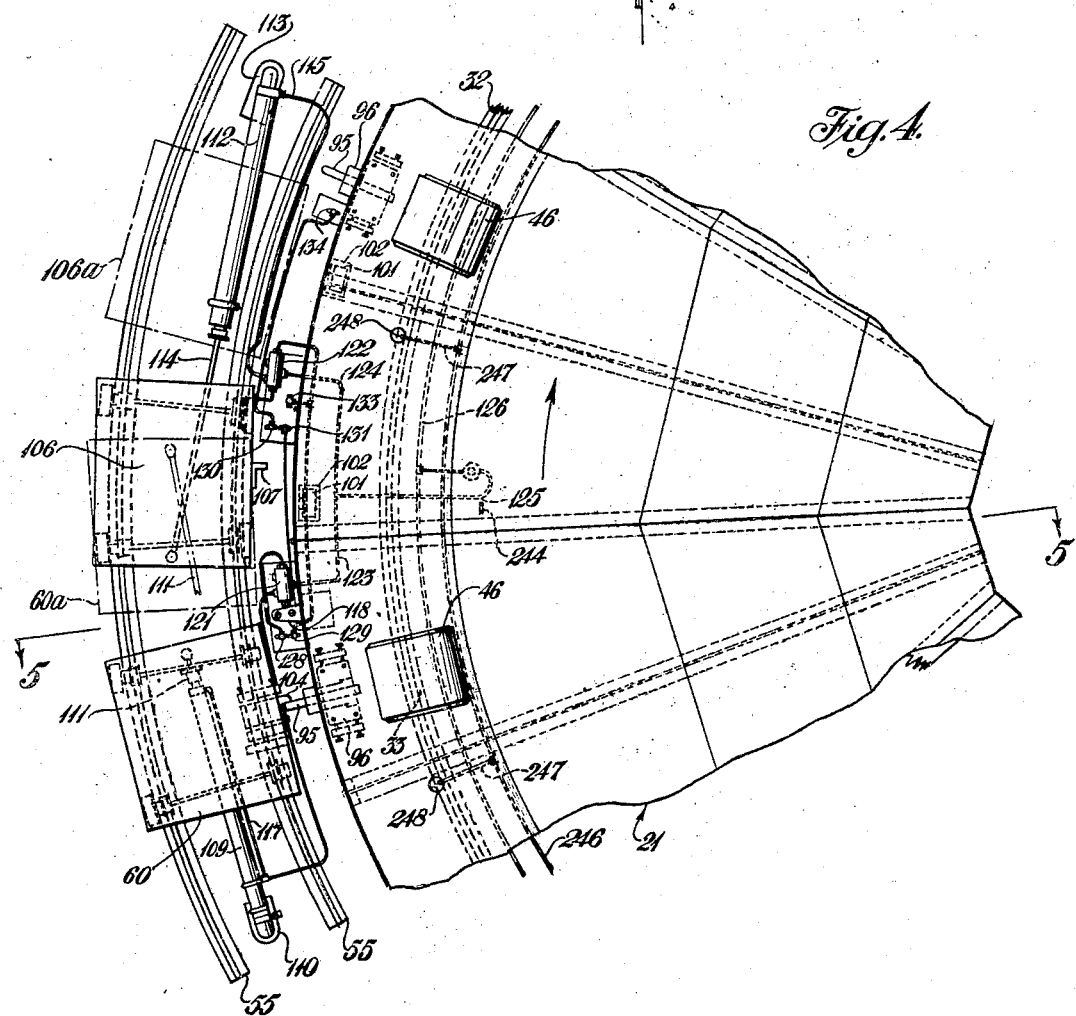

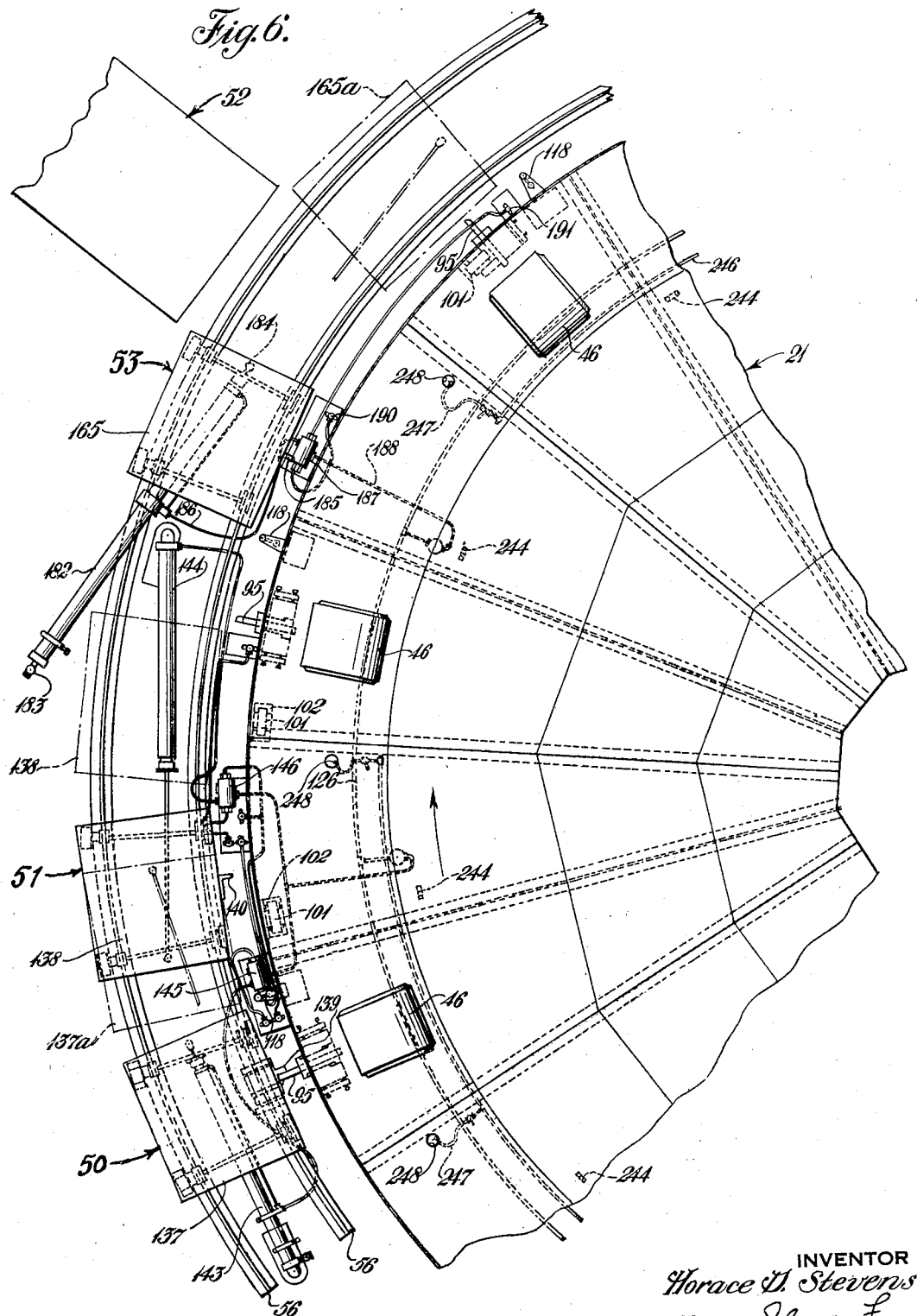

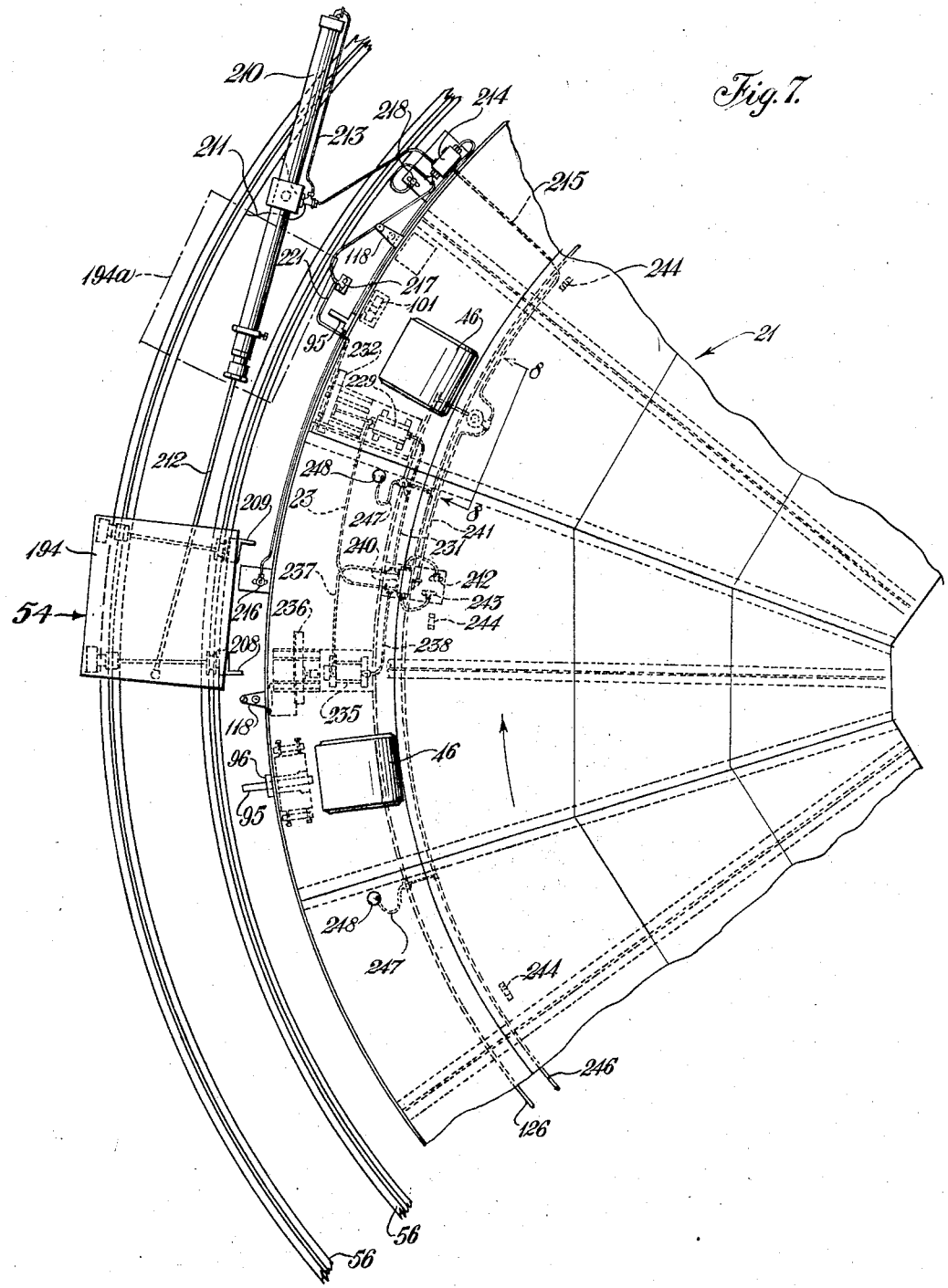

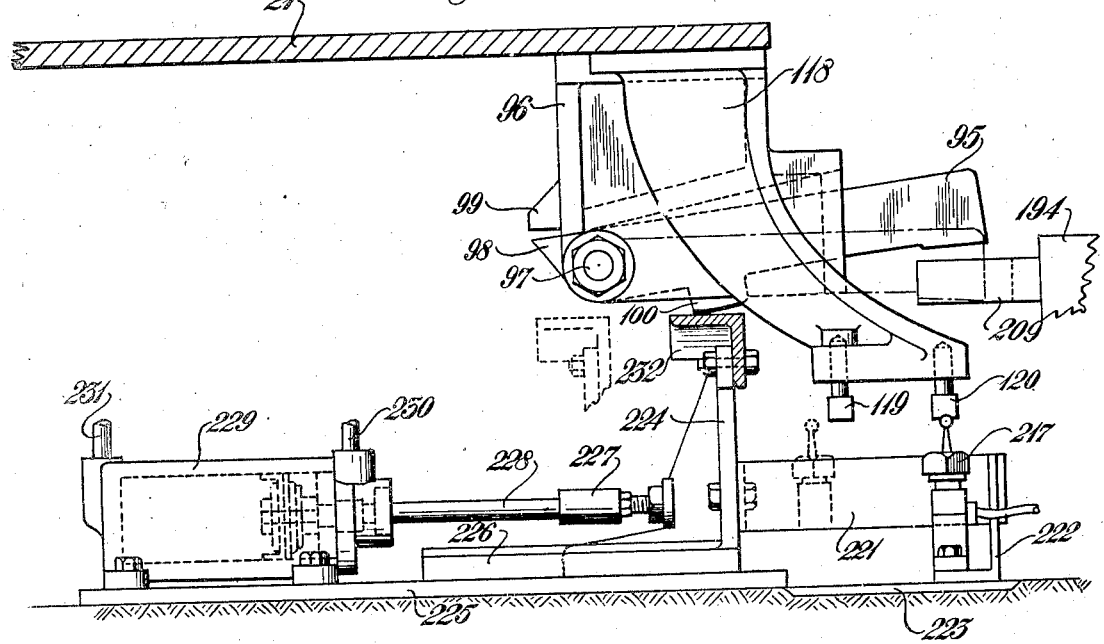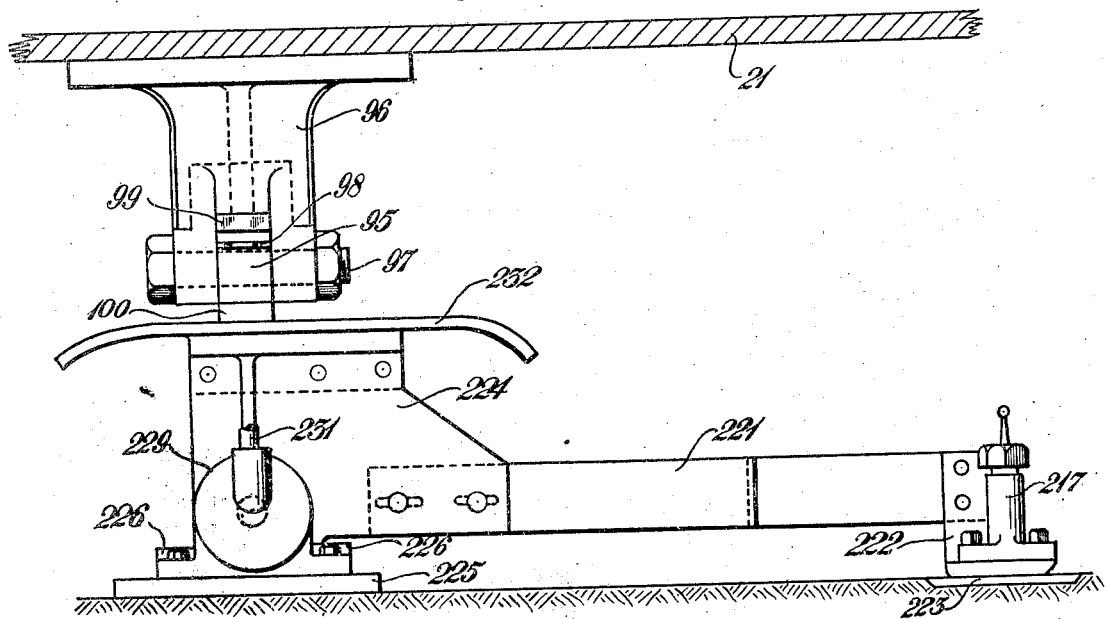

July 20, 1943.    H. D. STEVENS    2,324,985
APPARATUS FOR TIRE PRODUCTION
Filed July 27, 1940    9 Sheets-Sheet 7
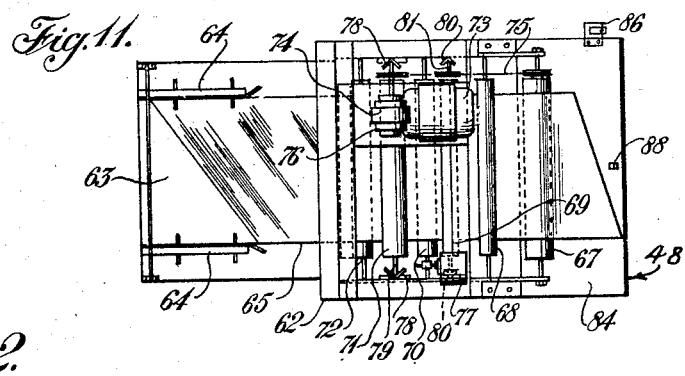
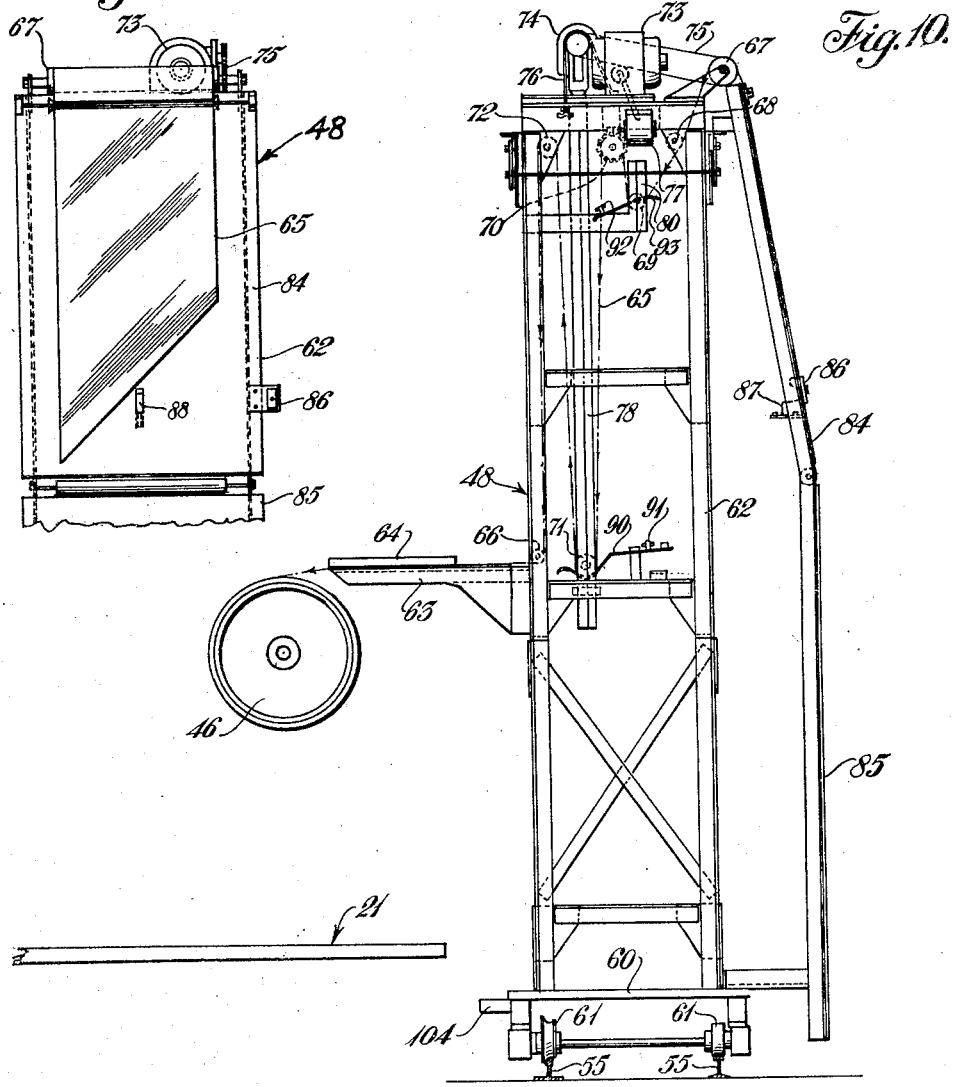
INVENTOR
Horace D. Stevens
BY Ely & Frye
ATTORNEYS

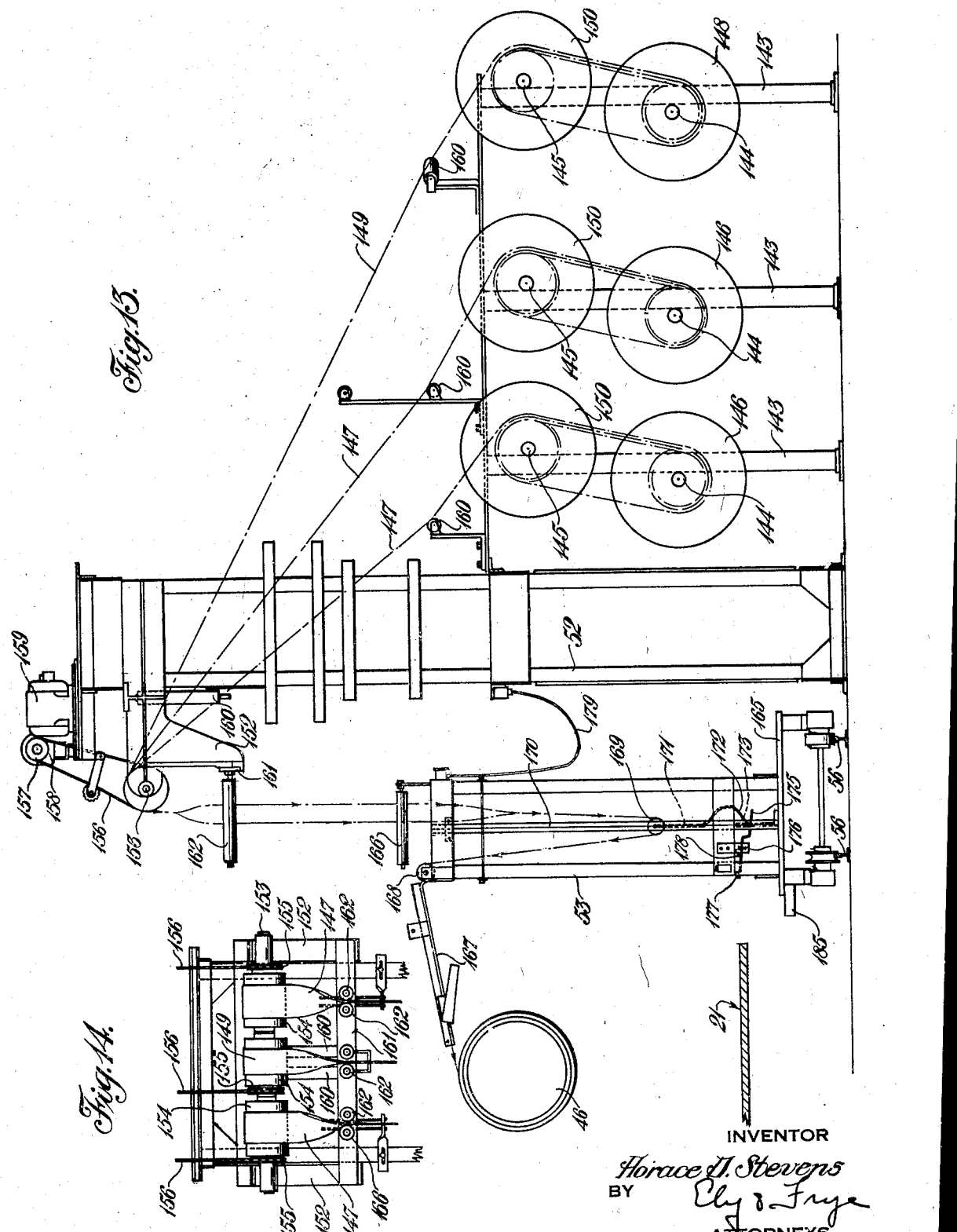

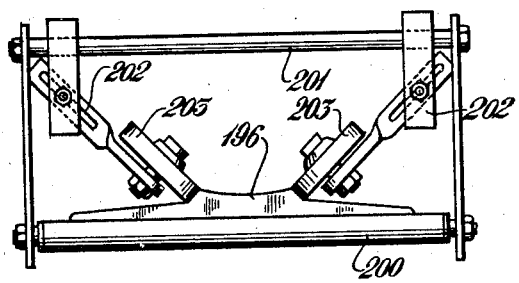
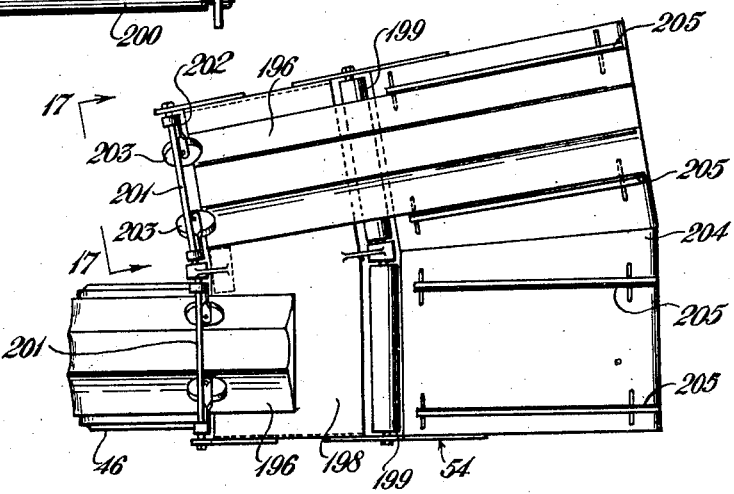
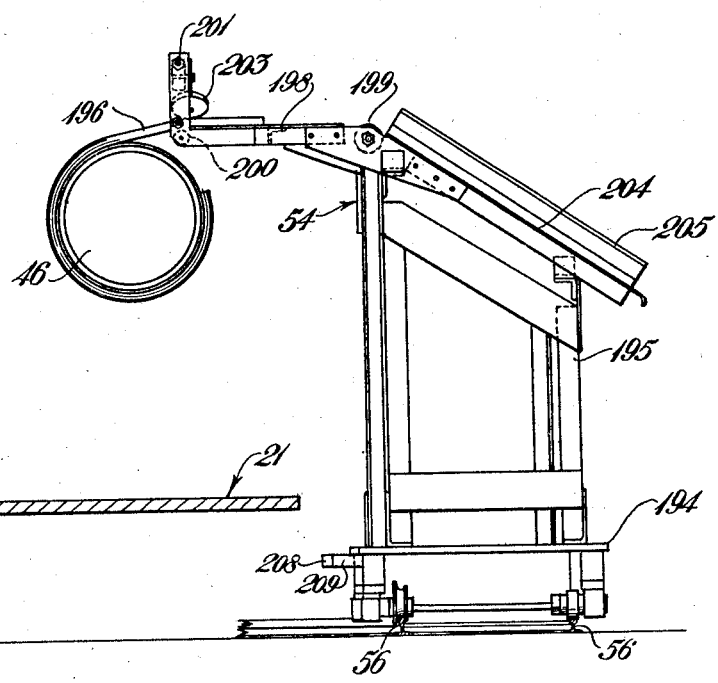

Patented July 20, 1943

2,324,985

UNITED STATES PATENT OFFICE 2,324,985

APPARATUS FOR TIRE PRODUCTION

Horace D. Stevens, Akron, Ohio, assignor to The Firestone Tire & Rubber Company, Akron, Ohio, a corporation of Ohio Application July 27, 1940, Serial No. 347,891

17 Claims. (Cl. 154—10)

This invention relates to apparatus for the production of pneumatic vehicle tires, and more especially it relates to improved tire building apparatus of the type wherein a plurality of rotatable tire building forms are moved, in progression, into operative juxtaposition to a succession of stock-supply stations where tire building material is supplied to the forms, the material being shaped and pressed to the forms between said stations.

Briefly stated, the invention comprises a turntable that is rotated upon a vertical axis continuously and at uniform speed. Mounted upon the turntable, at equally spaced points adjacent the periphery thereof, are tire building machines, each of which is substantially a complete tire building unit including a collapsible drum and means for driving the same, bead-setting mechanism, ply-folding mechanism, and ply-stitching and pressing mechanism, but not including stock-supply units. The latter, which supply the various kinds of tire building stock for the entire series of tire building machines are positioned at determinate points about the turntable where they supply stock to the successive tire building machines as the latter move into alignment with said units, radially of the turntable, during each traverse of their orbit. The stock-supply units are movable in an arcuate course, concentric with the turntable, for a limited distance, to the end that there will be no relative movement between a tire building machine and the stock-supply unit during the interval that stock is being removed from the supply unit and wound onto the drum of the tire building machine. Operators are required for the stock-supply units to replenish the stock as it is withdrawn therefrom, and operators on the turntable are required for attaching the stock to the drums and setting the tire building machines in operation to perform the various operations on the stock, and including an operator for removing the finished tires from the drums and preparing the latter for another cycle of operation. Each operator on the turntable performs but one operation, and walks to the succeeding tire building machine as soon as this operation is finished.

The chief objects of the invention are to increase the production of pneumatic tire casings; to reduce the number of operators required to maintain a determinate daily production of tires; to reduce the cost of manufacture of tires; and to increase the efficiency of the operators by requiring each to perform but a simple, easily learned operation. The invention further aims to provide in an improved manner for the moving of the stock-supply units in unison with the turntable as successive tire building drums move into alignment with said stock-supply units, and for returning said supply units to point of starting after they have been moved a determinate distance; and, in general, to provide improved apparatus for most efficiently accomplishing the objects set forth. Other objects will be manifest as the description proceeds.

Of the accompanying drawings:

Figure 4 is a fragmentary plan view of the apparatus at the region of the stock-supply units that furnish the first and second fabric plies to the tire building machines, showing mechanism for moving the supply units with the turntable and subsequently returning them to point of starting;

Figure 5 is a section on the line 5—5 of Figure 4;

Figure 6 is a fragmentary plan view of the apparatus at the region of the stock-supply units that furnish the third and fourth fabric plies to the tire building machines, and also furnish the tread ply and breaker strips, and showing mechanism for moving the said supply units with the turntable and subsequently returning them to point of starting;

Figure 7 is a view similar to Figure 4 and Figure 6 at the region of the supply unit that furnishes tread slabs to the tire building machines, before the supply unit has been engaged by the mechanism that moves it with the turntable;

Figure 8 is an enlarged section on the line 8—8 of Figure 7 showing a movable cam structure and means for moving the same, and a latch member in operative engagement with said cam;

Figure 9 is a side elevation of the structures shown in Figure 8 as viewed from the left thereof;

Figure 10 is a side elevation of a stock-supply rack such as is used to store rubberized fabric for the first, second, third, and fourth fabric plies of a tire;

Figure 11 is a plan view of the rack shown in Figure 10;

Figure 12 is a fragmentary rear elevation of the structure shown in Figure 10;

Figure 13 is a side elevation of a stock-supply rack that furnishes the tread ply and two chafer strips to the tire building drums;

Figure 14 is a fragmentary front elevation of the structure shown in Figure 13;

Figure 15 is a side elevation of a stock-supply unit that furnishes tread slabs to the tire building drums;

Figure 16 is a plan view thereof; and

Figure 17 is a fragmentary front elevation thereof, on a larger scale, as viewed from the line 17—17 of Figure 16.

Figure 1:
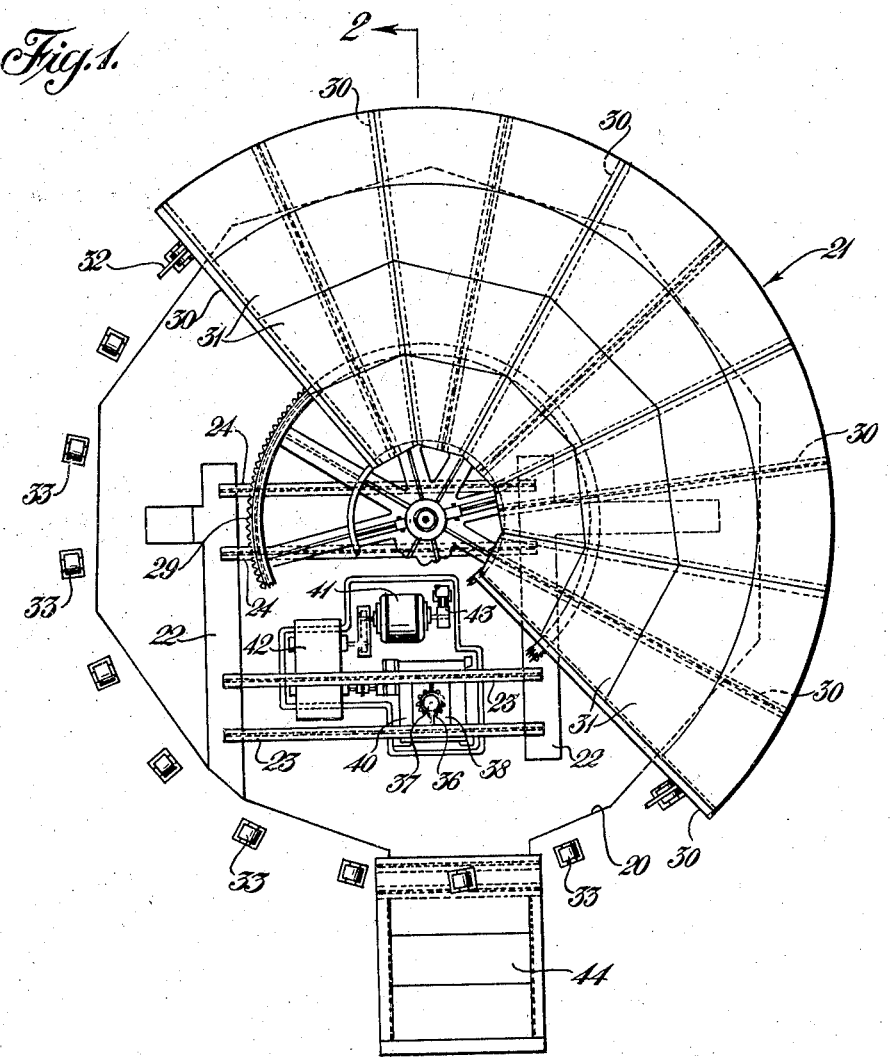
Figure 1 is a plan view of the turntable of the apparatus, a part thereof being broken away to reveal the underlying mechanism.
Figure 2:
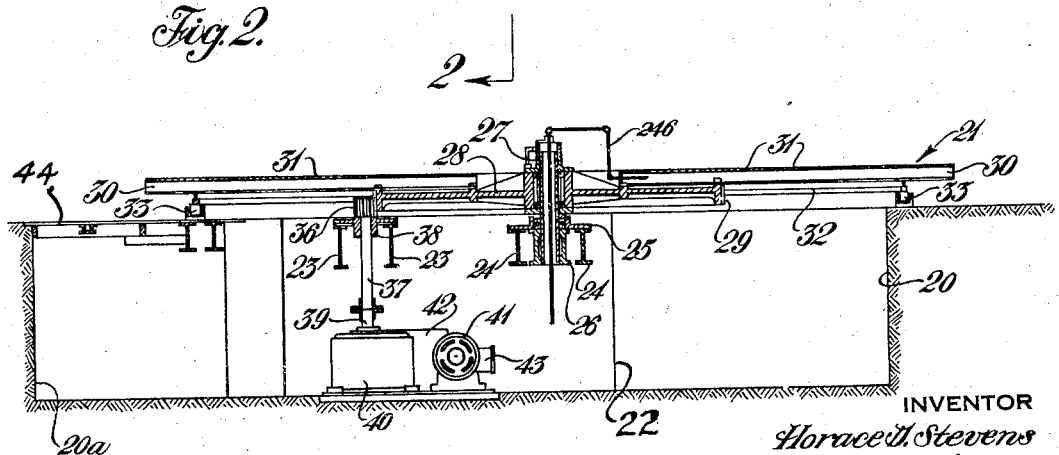
Figure 2 is a section on the line 2—2 of Figure 1.

Referring now to the drawings, especially Figures 1 and 2 thereof, there is shown a pit 20 over which the turntable, designated as a whole by the numeral 21, is located. Formed in the pit 20 are parallel piers 22, 22, and supported by the latter and spanning the space therebetween, at the top thereof, are two pairs of parallel I beams 23, 23, and 24, 24. The pit 20 is polygonal in plan but includes a portion 20a that extends locally outwardly from one corner thereof, the beams 24 being disposed adjacent each other at opposite sides of the axis thereof, the beams 23 being parallel to beams 24 and disposed laterally thereof. Mounted upon the beams 24, at the axis of the pit 20, is a bearing bracket 25, and supported therefrom is a downwardly extending quill housing 26 in which a vertically disposed, tubular, axial quill 27 is mounted. Journaled upon suitable bearings on the quill 27 and bearing bracket 25 is a circular hub 28 of the turntable 21, said hub being provided on its perimeter with gear teeth 29. Secured to the top of hub 28 is a circumferential series of radially extending beams 30, 30 that overhang the hub and extend beyond the walls of the pit 20. The beams 30 carry the platform or floor of the turntable 21, which platform is made up of a multiplicity of metal plates 31 that are substantially trapezoidal in contour. For supporting that portion of the turntable that extends outwardly of the hub 28, an endless rail 32 is mounted upon the under side of the beams 30, concentrically of the axis of the turntable and radially outwardly of the limits of the pit 20, said rail resting upon an annular series of casters 33 journaled in suitable supporting brackets about the pit. The arrangement is such as to enable the turntable to rotate about its axis, and to support a heavy load near its periphery.

For rotating the turntable 21, the gear 29 on the hub thereof is meshed with a pinion 36 that is mounted upon the upper end of a shaft 37, the latter being journaled near its upper end in a bearing bracket 38 that is supported upon the beams 23. The shaft 37 is coupled, at its lower end, to the drive shaft 39 of a reduction gear device 40, the latter being driven by an electric motor 41 through the agency of an interposed variable speed device 42. The motor 41 is provided with a magnetic brake 43 for quick stopping, if required. Access to the pit 20 for servicing the motor 41 and variable speed device 42 is had through the portion 20a of the pit that extends locally beyond the area of the turntable 21 and is concealed by a cover 44.

Mounted upon the turntable 21, near the perimeter thereof, are a plurality of tire building machines. As previously stated, each tire building machine is substantially a complete unit and comprises a rotatable collapsible form or drum 46 and means for driving the same, ply-folding mechanism, bead-setting mechanism, and ply-stitching and pressing mechanism, said mechanisms being mechanically and automatically operated under the control of an attending operator. The tire building machines per se are not a part of the present invention, and for this reason need not be shown in detail herein, it being sufficient merely to locate the positions of the collapsible forms or drums thereof. The said drums are designated by the numerals 46, and the relative positions of said drums on the turntable 21 is shown best in Figure 3. Said figure shows ten drums 46 symmetrically positioned about the perimeter of the turntable, which number has been found to be most satisfactory for rapid and economical production. It will be understood, however, that a greater or lesser number of tire building machines may be mounted on the turntable if conditions make such practical or desirable. The tire building machines are operated by seven operators who ride upon the turntable, each operator being skilled in a single tire building operation, and performing said operation upon successive tire building machines as the latter move into respective sectors of their orbital movement. The operators are thereby required to walk in the opposite direction to the direction of rotation of the turntable each time after completing an operation.

Figure 3:
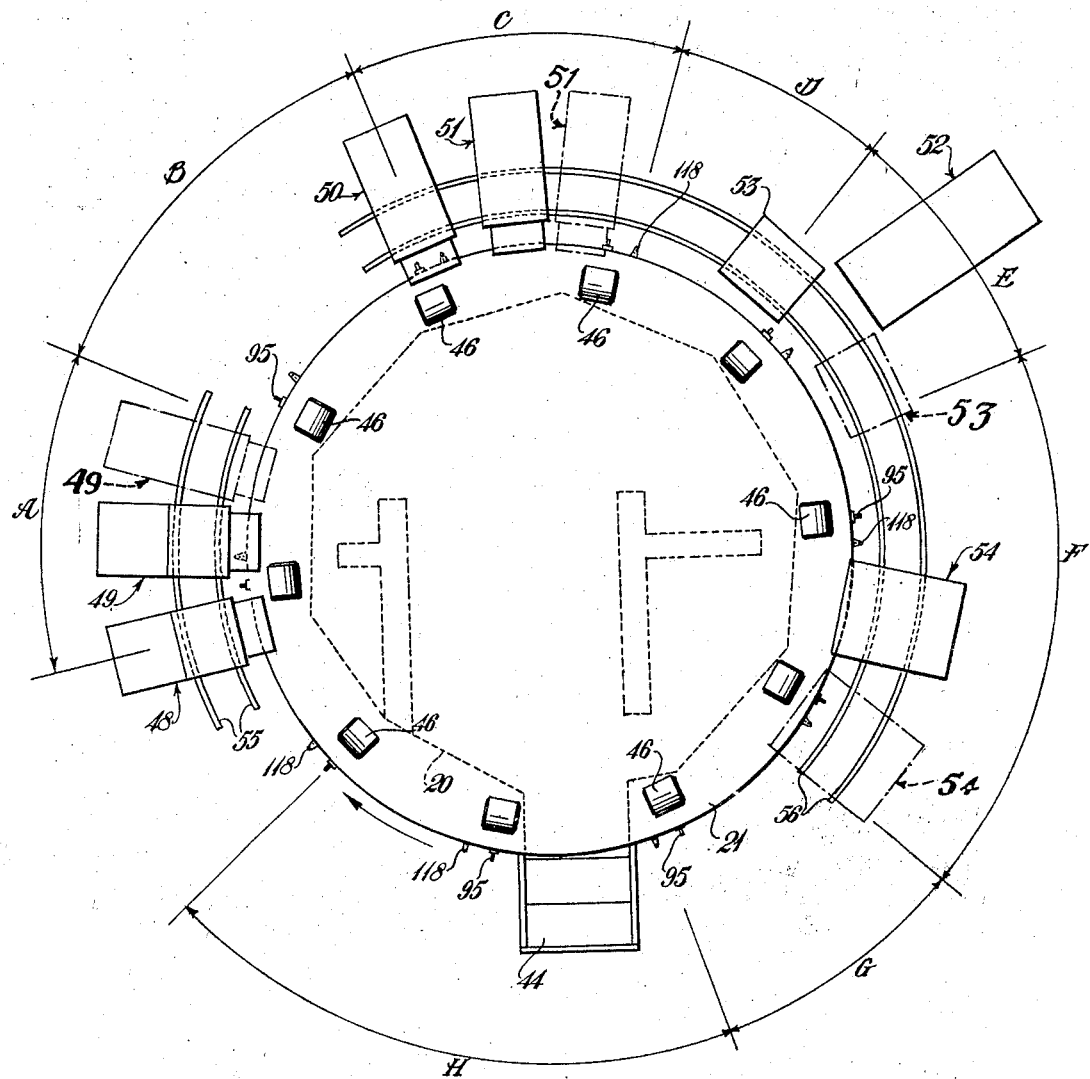
Figure 3 is a diagrammatic plan view of the apparatus showing the location of the tire building drums on the turntable, and the relative positions of the stock-supply units about the turntable.

Grouped about the turntable 21 are stock-supply units that furnish the constituent plies of stock required for the building of pneumatic tire casings, exclusive of the bead rings thereof. Figure 3 shows the relative locations of the various stock-supply units, said units being conventionally illustrated. As previously stated, the stock-supply units are movable in an arcuate course for limited distances with the turntable, and in the drawing (Figure 3) the normal positions of the units are shown in full lines, their limits of movement with the turntable being shown in broken lines. The stock-supply unit that furnishes the first, or #1 fabric body ply of a tire is designated as a whole by the numeral 48. In like manner numeral 49 designates the supply unit that furnishes the #2 fabric body ply of a tire, 50 designates the supply unit that furnishes the #3 fabric body ply of a tire, and 51 designates the supply unit that furnishes the #4 fabric body ply of a tire. The supply unit that furnishes the fabric tread ply and two chafer strips comprises a stationary rack 52 and a smaller, movable rack 53 that cooperates therewith. The unit that supplies the combination tread and sidewall slabs to the building machines is designated 54. The units 48 and 49 are mounted upon an arcuate section of trackway 55, and the units 50, 51, 53, and 54 are mounted upon a longer arcuate section of trackway 56, both track sections being concentric with the turntable 21.

In Figure 3 also is indicated the various sectors of the orbit of the tire building machines and the relation of said sectors to the stock-supply units, said sectors being designated A to H, inclusive. The stock-supply units 48 and 49 are located in sector A and it is in this sector that the initial tire building operations are performed. Each tire building machine moving, in the direction of the arrow in Figure 3, into sector A already has its drum 46 in expanded condition and cemented, and tire beads are in place on its bead setting rings. As each tire building drum 46 moves into radial alignment with the stock-supply unit 48, the latter is engaged by the turntable 21 and moved along its trackway 55 toward supply unit 49. Operator #1, who is stationed at sector A, attaches the leading end of the fabric strip 48 to the drum 46, effects a single revolution of the drum to wrap one ply of the fabric around the drum, and severs the ply from the supply strip. The supply unit 48 moves with the turntable almost to the position of supply unit 49 as shown in full lines in Figure 3, and in so doing moves the supply unit 48 ahead of it. The supply unit 48 is disengaged from the turntable before it fully reaches the inoperative position of supply unit 49, and both units are returned immediately to normal inoperative position. By this time the drum 46 under discussion has reached radial alignment with supply unit 49, and the turntable automatically engages said supply unit and moves it along its trackway 55 to the position shown in broken lines in Figure 3 before releasing it so that it may be returned to point of starting. During the interval that supply unit 49 is moving with the turntable, operator #1 attaches the leading end of the fabric strip in unit 49 to the tire structure on drum 46, effects a single revolution of the latter to draw one ply (the second tire ply) of the fabric about the drum, and then severs the ply from the supply strip. Operator #1 then actuates automatically operating instrumentalities of the tire building machine that stitch the fabric plies on the drum down over the shoulders at opposite ends of the latter, mount the tire beads on the respective shoulders of the drum, and then turn the margins of the fabric plies up around said beads. The said automatic operations occur during the time that the drum is moving through sector B. After actuating said automatic instrumentalities, operator #1 walks back to the succeeding drum 46 which is just entering sector A, and repeats the operations aforementioned. The said automatic operations are completed immediately prior to the entrance of the drum into sector C.

As the drum enters sector C, the turntable successively engages stock-supply units 50 and 51 in exactly the same manner as previously described with relation to supply units 48 and 49. Operator #2 is stationed in sector C, and performs the manual operations necessary for withdrawing the third and fourth fabric plies from the supply units 50 and 51, respectively, and mounting them upon the drum. Operator #2 then walks back to the succeeding drum to perform the same operations thereon. The drum 46 with four plies of fabric thereon next moves through a relatively short sector D where no operations are performed.

As the drum enters sector E it moves into alignment with the stock-supply unit 52, and the latter is engaged by the turntable and moved with it along the trackway 56 from the position shown in full lines in Figure 3 to the position shown in broken lines therein. At sector E operator #3 attaches the leading ends of chafer strips and tread ply to the drum, and causes rotation of the latter to draw said strips onto the drum from their stationary supply unit 52, the supply unit 53 serving primarily to guide said strips and to relieve tension therein as subsequently will be explained. As the drum leaves sector E the stock unit 53 returns to point of starting and operator #3 actuates automatic instrumentalities on the tire building machine that turn down the outer margins of the chafer strips and overbead fabric plies and fold them about the tire beads, which operations are completed in sector F before the drum reaches the stock-supply unit 54. When the drum reaches radial alignment with supply unit 54, the turntable 21 engages the latter and moves it along trackway 56 from the position shown in full lines in Figure 3 to the position shown in broken lines therein. When the unit reaches said broken line position it is automatically released from the turntable and returned to point of starting. The stock unit 54 carries two tread and sidewall slabs disposed side by side, and means is provided whereby the turntable 21 engages the unit to move it forwardly as successive drums 46 move into radial alignment with alternate tread slabs on the unit, as subsequently will be more fully explained. Operators #4 and #5 are stationed at sector F, and while a tread slab of supply unit 54 is in radial alignment with the drum 46, the operators attach the adjacent end of the tread slab to the tire structure on the drum and effect one revolution of the latter to draw the tread slab thereabout. Previously, however, one of said operators has swabbed the tire structure with a volatile solvent to effect improved adhesion of the tread slab. After the tread slab is on the drum, one of the operators splices the ends thereof, and as the drum passes out of sector F the operator actuates automatically operating mechanism of the tire building machine that rolls down the tread. Said tread rolling operation continues as the drum passes through sector G, the tread rolling mechanism automatically returning to inoperative position as the drum enters sector H.

Operators #6 and #7 are stationed at sector H, and as the drum moves into this sector one of them manually stitches down the tread splice, thus completing the tire building operation. The operator then collapses the building drum 46, removes the finished tire therefrom and places the tire upon a conveniently adjacent conveyor that carries it away from subsequent vulcanization. The other operator then mounts tire beads on the bead setting rings of the tire building machine, after which he expands the drum to its normal annular shape, and cements the periphery thereof. The drum is then ready to pass from sector H to sector A where the operations described are repeated.

Referring now to Figures 10 to 12, it will be seen that the stock-supply unit 48 that supplies the first ply of fabric to the tire building drums 46 comprises a carriage 60 provided with wheels 61, 61 that run upon the rails 55, and an upright open frame structure 62 mounted upon said carriage. The frame 62 comprises an integral tray 63 that projects from the front thereof and overhangs the turntable 21, the outer end of the tray thus being adjacent the orbit of tire building drums 46 carried by the turntable. Tray 63 is provided with adjustable lateral guides 64, 64 for a strip of tire building material 65 that passes over the tray as it is drawn onto a drum 46, there being a guide roller 66 at the rear of the tray, under which roller the strip 65 passes. The fabric strip 65 enters the supply unit from the rear thereof and in its course therethrough it passes in succession over a driven feed roller 67, past a fixedly positioned guide roller 68, under a floating roller 69, over a driven feed roller 70, under a floating roller 71, over a fixedly positioned guide roller 72, thence to the guide roller 66 aforementioned. The feed roller 67 is driven by means of a motor 73 and reduction gear device 74 that are mounted on top of the framework 62, said reduction gear device being connected to feed roller 67 by a driving chain 75. A friction device or brake 76 is operatively associated with the reduction gear device to prevent overrun when power to the motor 73 is disconnected. The driven feed roller 70 is driven by means of a small motor 77 that has a worm and gear driving connection therewith. The floating roller 71, which rests in a loop or festoon of fabric 65 supported between rollers 70, 71, is guided by angular vertical guideways 78, 78 that engage the opposite ends of an axial shaft 79 on which said roller 71 is journaled. In like manner the floating roller 69 is guided by angular vertical guideways 80 that engage its shaft 81, the guideways 80 being much shorter than guideways 78.

On the back of the frame 62 are splice-boards 84, 85, of which the upper splice-board 84 is somewhat tilted or inclined. Said splice-boards serve as a backing against which individual lengths of rubberized tire building fabric are placed for splicing to the trailing end of the length of fabric already within the supply unit. Mounted upon one margin of the splice-board 84 is an electric switch 86 that is in the circuit of the motor 73. Another switch 87, Figure 10, in the circuit of the motor 73 and in series with the switch 86 is mounted upon the rear of splice-board 84, centrally thereof, and has an operating lever 88 that extends through a suitable slot in the splice-board so as to be engaged by a fabric strip that may overlie it on said splice-board 84. The arrangement is such that the weight of the fabric will effect the closing of switch 87, with the result that subsequent closing of switch 86 will effect driving of the motor 73. When the trailing end of strip 65 moves off the operating lever of switch 87, as shown in Figure 12, switch 87 automatically opens and stops the drive of motor 73. The operation of motor 77 is controlled by two switches in series of which switch 91 is a mercury switch that is mounted upon a tiltable arm 90, the latter being engageable with the floating roller 71 at the lower limit of the latter's traverse. The other switch controlling motor 77 is a mercury switch 92 that is mounted upon a tiltable arm 93, the latter being engageable with the floating roller 61 at the lower end of the traverse of the latter.

Operation of the supply unit is as follows: Fabric 65 is intermittently fed into the unit from the rear thereof by manual operation of the switch 86 which starts the motor 73, the stock arranging itself in a deep festoon between rollers 67 and 70, which arrangement enables the arm 93 to assume a position in which its switch 92 is closed. There is also a festoon of stock between rollers 70 and 72 as shown, from which festoon the stock is intermittently withdrawn as it passes to the building drum 46. When the latter festoon is full, the floating roller 71 is at the bottom of its traverse and engages and tilts the arm 90 so that the switch 91 thereon is open. As stock is withdrawn from the unit, the shortening of the last mentioned festoon lifts the floating roller 71 and thereby tilts arm 90 to close switch 91, with the result that if the switch 92 also is closed the motor 77 will come into operation to drive roller 70 and thus feed fabric to replace the fabric withdrawn therefrom. Motor 77 stops running as soon as roller 71 engages arm 90 and opens switch 91. If for any reason the supply of fabric in the unit has not been replenished, the festoon thereof in which the floating roller 69 is located gradually will shorten and eventually will engage the roller 69, as shown, and lift the same, thus tilting arm 93 so as to open switch 92. Under these conditions motor 77 is idle and cannot feed more fabric into the forward festoon until the rear festoon has been replenished.

The stock supply units 49, 50, and 51 are substantially identical with supply unit 48 just described, and furnish the second, third, and fourth plies of fabric to the building drums 46. As is usual practice, the bias angle of the cords of successive plies is reversed, and the width of the third and fourth plies is somewhat greater than the width of the first two plies.

The various stock-supply units are moved in arcuate courses of limited length, concentrically of the axis of turntable 21, by the turntable itself, and to this end dogs or latches 95, 95 are carried by the turntable, at the periphery thereof and in radial alignment with each tire building drum 46, for engagement with suitable lugs projecting from the stock-supply units. As is most clearly shown in Figures 8 and 9, each latch 95 is pivotally mounted in a bracket 96 that is attached to the under side of turntable 21, the inner end of each latch being traversed by a pivot pin 97. A tongue or lug 98 projecting from the inner end of the latch is engageable with an abutment 99 on bracket 96 for holding the latch normally in horizontal position. The lower margin of the latch 95 is formed locally with a downwardly projecting element 100 that is engageable with means for elevating the free end of the latch, as shown in full lines in Figure 9, to disengage said lug from a stock-supply unit. One such latch-lifting means consists of a roller 101 journaled in a bracket 102 that is mounted upon the floor, beneath the turntable 21 and in the orbit of the latch elements 100, as shown in Figure 5. Said lifting rollers 101 are determinately positioned with relation to certain supply units as presently will be explained.

Referring now to Figures 4 and 5, the carriage 60 of supply unit 48 is shown with a laterally projecting lug 104 that extends into the orbit of the latches 95 so as to be engaged by successive latches for moving the supply unit with the turntable. Figure 4 also shows the carriage 106 of the stock-supply unit 49, said carriage 106 being provided with a laterally projecting lug 107 for engagement with the latches 95. Engagement of a latch 95 with lug 104 will result in the moving of carriage 60, and stock rack thereon, from the position shown in full lines in Figure 4 to the position indicated by the broken lines 60a therein, at which position a roller 101 lifts the latch 95 out of engagement with lug 104. The carriage 60 then requires to be returned to point of starting and for this purpose a one-way fluid pressure operated cylinder 109 is provided. The latter is swivelled at its rear end to a floor bracket 110 between the rails of trackway 55, the cylinder having a piston rod 111 extending from its front end, the outer end of the piston rod being pivotally connected to the carriage 60 on the under side thereof. The cylinder 109 is so arranged that movement of the carriage 60 from its full line position to its broken line position 60a withdraws the piston rod 111 from the cylinder 109. Pressure fluid is supplied to the cylinder 109 at the front end thereof, through the agency of supply pipe 117, for forcing the piston rod back into the cylinder, to restore the carriage 60 to the normal, full line position shown. Control means for the pipe 117 whereby the cylinder 109 is charged in determinate time relation to the disengagement of latch 95 from the lug 104 presently will be described.

It will be observed in Figure 4 that the broken line position of carriage 60a partly overlaps the normal, full line position of the carriage 106 of supply unit 49. The result of this arrangement is that the carriage 60 in moving with the turn-table 21 engages carriage 106 and moves it along the trackway before it. When the latch 95 disengages from lug 104 and cylinder 109 retracts carriage 60 to normal position, it is required that carriage 106 also return to normal position and to this end a one-way fluid pressure operated cylinder 112 is provided. The latter is swiveled at its rear end to a floor bracket 113, between the rails of trackway 55, the cylinder having a piston rod 114 extending from its front end, the outer end of the piston rod being pivotally connected to the carriage 106 on the under side thereof. The cylinder 112 is so arranged that movement of the carriage 106 in a clockwise direction under the impetus of carriage 60 forces the piston rod 114 into the cylinder 112. Pressure fluid is supplied to the cylinder 112 at the rear end thereof, through the agency of a supply pipe 115, for forcing the piston rod 114 outwardly of the cylinder, to restore the carriage 106 to the normal full line position shown, immediately after latch 95 is disengaged from lug 104 and carriage 60 is returned to normal position. Latch 95 is disengaged from lug 104 before carriage 60 has been moved to the normal inoperative position of carriage 106, and both carriages are returned quickly and reach normal position before latch 95 engages lug 107 of carriage 106. When latch 95 engages lug 107 the carriage 106 is moved along trackway 55, in the manner previously described with relation to carriage 60, the carriage 106 reaching the position shown in broken lines at 106a before the latch 95 is disengaged from lug 107 by a roller 101 as previously described. Immediately thereafter the cylinder 112 again is charged to restore the carriage 106 to its normal full line position shown. The time required for each carriage 60 and 106 to travel from its inoperative full line position to its alternative broken line position is sufficient for operator #1 to withdraw a ply of fabric from the storage rack on each carriage and apply said plies to the drum 46 in superposed convolutions, as previously explained.

The charging and discharging of the fluid pressure cylinders 109, 112 in determinate time relation to the engagement and disengagement of the turntable latch 95 with the carriage lugs 104, 107 is effected automatically, and to this end a plurality of brackets 118, 118 are attached to the under side of turntable 21, at the periphery thereof, each bracket 118 being positioned on the turntable somewhat in advance of a latch 95. As is best shown in Figure 9, each bracket projects somewhat downwardly from the turntable and has its lower end provided with a pair of downwardly projecting fingers or studs 119, 120, which studs are in alignment radially of the turntable. The said studs are utilized for operating the pilot valves of a pair of control valves 121, 122, the valve 121 controlling the operation of cylinder 109 and the valve 122 controlling the operation of cylinder 112.

The valves 121, 122 are standard articles of commerce and are known as two-way, balanced, piston type valves. For this reason a detail showing of the valves is not believed to be necessary herein. Supply pipe 117 of cylinder 109 connects with the outlet port of valve 121, and supply pipe 115 of cylinder 112 connects with the outlet port of valve 122. Fluid pressure is conducted to the valves 121, 122 through supply pipes 123, 124, respectively, which pipes connect with a single supply pipe 125, the latter connecting with a trunk supply pipe 126 that extends circumferentially of the apparatus, below the turntable 21, and supplies fluid to other valves subsequently to be described. Movement of the pistons of valves 121, 122, to effect the admission of pressure fluid to the cylinders 109, 112, and its discharge therefrom, is controlled by a series of bleeder valves or pilot valves, which valves are mounted in the orbit of studs 119 or 120 so as to be operated thereby. Positioned close to valve 121 are pilot valves 128, 129 of which valve 128 controls valve 121 in a manner to effect the discharge of cylinder 109 and valve 129 controls valve 122 in a manner to discharge cylinder 122. Valves 128, 129 are arranged to be operated concurrently by the studs 120, 119, respectively. Positioned near valve 122 are pilot valves 130, 131 of which valve 130 controls valve 122 in a manner to effect the charging of cylinder 112 and valve 131 controls valve 121 in a manner to charge cylinder 109. Valves 130, 131 are arranged to be operated concurrently by the studs 120, 119, respectively. Mounted near valve 122 in position to be operated shortly after pilot valve 131 is a pilot valve 133 that controls the operation of valve 122 to effect the discharge of cylinder 112. Positioned well beyond valve 122 is a pilot valve 134 that controls valve 122 to effect the charging of cylinder 112.

A cycle of operation of the stock supply units of sector A of the apparatus is as follows: First the valve operating studs 119, 120 operate pilot valves 129, 128 to exhaust cylinders 112, 109, and immediately thereafter latch 95 engages lug 104 of carriage 60 and moves the latter towards its broken line position 60a, during a part of which movement it pushes the carriage 106 before it. During this interval operator #1 withdraws the first tire-ply from the supply rack on carriage 60 and mounts it on drum 46. As carriage 60 reaches position 60a, the latch 95 engages a roller 101 and is lifted thereby out of engagement with lug 104. Immediately thereafter studs 119, 120 operate pilot valves 131, 130 and thereby operate valves 121, 122 to charge cylinders 109 and 112, with the result that both carriages, 60 and 106, are restored to their inoperative, full line positions as shown in Figure 4. Almost immediately thereafter stud 119 operates pilot valve 133 to effect the discharge of cylinder 112, and substantially concurrently therewith latch 95 engages lug 107, and thereby moves the carriage 106 toward its alternative position shown at 106a. As soon as the carriage 106 reaches said alternative position, latch 95 engages a roller 101 and is lifted thereby out of engagement with lug 107 of said carriage, thus releasing the latter. Next, stud 119 operates pilot valve 114 to effect the charging of cylinder 112, and the latter moves the carriage 106 back to its normal inoperative position. During the interval that the carriage 106 moves with the turntable, the operator #1 has withdrawn a ply of fabric from the stock-supply rack thereon, and mounted said ply on the drum 46, in superposed relation to the first ply thereon. After applying the second fabric ply to the drum 46, the operator sets in action the automatically operating instrumentalities that stitch the two fabric plies down over the shoulders of the drum, mount the tire beads thereon, and turn the margins of the fabric plies up around the tire beads, which operations continue as the drum passes through sector B. This completes the cycle of operations that occur in sector A, which operations are repeated as successive drums 46 enter said sector.

As previously stated, stock-supply units 50 and 51 are substantially identical with stock-supply units 48 and 49, each comprising a stock-storage rack such as that shown in Figures 10 to 12 and a carriage upon which said rack is mounted, the carriage of supply unit 50 being designated 137 and the carriage of supply unit 51 being designated 138. Carriages 137, 138 ride upon the trackway 56, and are provided with laterally projecting lugs 139, 140, respectively, for engagement with the latches 95 of turntable 21 whereby said carriages are moved with the turntable from the inoperative positions shown in full lines in Figure 6 to the alternative positions shown in broken lines 137a, 138a, respectively, in said figure. Rollers 101 are properly positioned beneath the turntable 21 to disengage the latches 95 from the carriage lugs 139, 140 at the proper places. In all other respects the supply units 50 and 51 are identical with the supply units 48 and 49 previously described, and operate and function in the same manner. Thus, fluid pressure cylinders 143, 144, respectively, are provided for restoring the carriages 137, 138 to normal position after their release from the turntable 21, control valves 145, 146 are provided for operating said cylinders, and a plurality of pilot valves are provided for operating the said control valves in proper time relation to the engagement and disengagement of latches 95 with lugs 139, 140. The studs 119, 120 on brackets 118 operate said pilot valves in exactly the same manner and sequence as in the construction shown in Figure 4. Operator #2 in sector C withdraws a ply of stock from each supply unit 50, 51 and applies said plies in superposed relation upon the plies on a drum 46 during the intervals that the carriages 137, 138 move with the turntable. This completes the cycle of operations that occur in sector C, which operations are repeated as successive drums 46 enter said sector. Upon leaving sector C, each drum passes quickly through sector D, where no work is performed upon it, and then enters sector E to receive a relatively narrow tread ply that is laid along the circumferential centerline of the structure on the drum, and chafer strips laid along the respective lateral margins thereof.

The stock-supply unit of sector E comprises a stationary supply rack 52 and a smaller, movable supply rack 53, both of which are shown in detail in Figures 13 and 14. The stationary supply rack consists of an open framework that comprises three upright posts each designated 143, each of which posts carries two, transverse, horizontal spindles 144, 145. Two of the spindles 144 carry supply reels 146 of continuous chafer strip material 147 that is interwound with a suitable liner, and the third spindle carries a supply reel 148 of continuous tread ply material 149 also interwound with a suitable liner. The spindles 145 carry respective liner rewind reels 150 upon which said liners are wound as the various stock-plies are withdrawn from their supply reels, as shown. Although Figure 13 shows but three stock reels and three liner rewind reels, there are, in fact, a duplicate reserve set of reels (not shown) mounted upon the spindles 145, 145 on the far side of the posts 143. The reserve reels make it possible quickly to attach the leading ends of the reserve ply strips to the trailing ends of the strips threaded through the apparatus as the supply reels of the latter are exhausted. Thus the replenishing of the stock rack is effected without loss of time and without stopping of the turntable.

Adjacent the top of the rack 52, on the side thereof nearest the turntable 21, are mounted brackets 152, 152 that support a non-rotatable horizontal shaft 153, and journaled on the latter are three driven feed rollers 154, 154. Each of the latter has a sprocket 155 attached to its hub, about which sprocket is trained a sprocket chain 156. The latter are also trained about respective sprockets, such as the sprocket 157 on a reduction gear device 158, the latter being driven by an electric motor 159 mounted on top of the rack 52. The tread ply strip 149 passes over the middle feed roller 154, and the respective chafer strips 147 pass over the laterally positioned feed rollers 154. Between said feed rollers and the supply reels of said strips are suitably disposed guide rollers 160, 160 that support and divert the strips to the proper feed rollers. Below the shaft 153, the brackets 152 carry a support plate 161 that carries a plurality of guide rollers 162, 162 that are arranged in pairs, and are horizontally disposed with their axes at right angles to the axis of feed rollers 154. Each pair of rollers 162 is positioned centrally below a feed roller 154, the arrangement being such that the strips 147, 149 may pass downwardly from said feed rollers and pass between the respective pairs of rollers 162, being turned thereby through an angle of 90 degrees, as shown, in which position they pass to the movable stock-supply rack 53 that is positioned therebelow.

The stock-supply rack 53 is mounted upon a movable carriage 165 that rides upon the trackway 56 between the stock rack 52 and the turntable 21. The rack 53 comprises an open framework upon the top of which is carried a plurality of guide rollers 166 arranged in pairs in the same manner as guide rollers 162 and parallel to the latter, the stock strips 147 and 149 passing between the roller pairs 166 as they enter the stock rack 53. At the top of the rack 53, on the side thereof nearest the turntable, is an overhanging tray 167, the outer end thereof being disposed adjacent the tire building drums 46 as the latter move in their orbit past the stock rack 53. The top of tray 167 is provided with the usual lateral guides for the ply strips 147, 149 that pass over said tray in moving to a building drum 46, and at the inner end of said tray are guide rollers, such as the guide roller 168, for diverting the respective strips 147, 149 onto the tray, said rollers 168 being disposed on a common horizontal axis arranged at right angles to the axes of the rollers 166. Between the rollers 166, 168 the respective stock strips 147, 149 are disposed in festoons, and supported in each festoon is a floating roller 169 that is positioned between angular end-guides, such as the guide 170, said roller being journaled upon a wire frame 171 that is engaged by said guides. Suspended from the wire frame 171 is a flexible leather strap 172, and suspended from the lower end of the latter is a weight 173 that also is guided in the end-guides 170. The arrangement is such that the roller 169 will rise or fall accordingly as the festoon of strip material lengthens or shortens, such movement of the roller also moving the weight 173 up or down.

A switch arm 175 pivoted at 176 on the rack 53 has an end thereof that projects into the path of movement of the weight 173, so as to be tilted downward, as shown, when the said weight rests thereon. A counterweight 177 on the other end of the switch arm tilts the arm in the other direction when the weight 173 is lifted. Mounted upon the switch arm 175 is a mercury switch 178 that controls the drive of the motor 159, said switch closing the motor circuit to drive the motor when the weight 173 is lifted from the switch arm, and opening the motor circuit to stop the motor drive when the weight 173 engages the switch arm and tilts it downwardly. No brake is provided for the motor 159, and the latter will coast somewhat after the switch arm 173 is tilted to open open the switch 178, but because of the flexibility of the strap 172, which allows it to bow as shown in Figure 13, the roller 169 is free to move relatively of the weight 173 and thus it always will rest at the bottom of the festoon of strip material and maintain it in taut condition. The electrical connections from the switches 178 to the motors 159 pass through a flexible electric cable 179 that connects the rack 53 to the rack 52. It will be understood that as the strips of material 147, 149 are drawn onto a drum 46, they shorten the festoons of material, and the driving of the motors 159 replenishes the festoons with material drawn from the supply reels 146, 148. The arrangement of the guide rollers 162, 166 is such that the portions of the ply-strips 147, 149 between said rollers are disposed at such an angle that movement of the stock-supply unit 53 is substantially transverse to the plane thereof, thus facilitating such movement of the unit.

The relative extent of the movement of the supply unit 53 with the turntable 21 is shown in Figure 3. Means for restoring the said supply unit to its normal inoperative position is shown in Figure 6, said means comprising a single-acting fluid pressure cylinder 182 that is pivotally mounted at its rear end at 183 upon a suitable floor bracket. Extending from the forward end of the cylinder 182 is a piston rod 184, the outer end of which is pivotally connected to the under side of the carriage 165. The side of the carriage nearest the turntable 21 is provided with an outstanding lug 185 that projects into the orbit of the latches 95 of said turntable, whereby said latches may engage said lug to move the carriage, and stock rack thereon, in clockwise direction with said turntable to the position shown in broken lines and designated 165a. The cylinder 182 is so arranged that such movement of the carriage 165 withdraws the piston rod 184 from said cylinder, as shown in the broken line position 165a of the carriage. Fluid pressure for forcing the piston rod 184 into the cylinder 182, to restore the carriage to its inoperative full line position, is conducted to the cylinder by supply pipe 186 that has connection with the forward end of the cylinder. Controlling the supply of pressure fluid to the pipe 186 is a piston-type valve 185 that is identical with the piston-type valves previously described, said valve having an inlet pipe 188 communicating with the trunk supply pipe 126. Operation of valve 187 is effected by means of pilot valves in the manner hereinbefore described. Thus pilot valve 190 positioned at the inoperative full line position of the carriage 165 controls the operation of valve 187 to exhaust the cylinder 182, and pilot valve 191 positioned at the alternative broken line position 165a of the carriage controls the operation of valve 187 to charge the cylinder 182. Both valves 190, 191 are disposed in the orbit of the studs 119 of the brackets 118 carried by the turntable 21, so as to be operated thereby. There is a roller 101 disposed adjacent the pilot valve 191 in the orbit of the projecting elements 100 of the latches 95, for lifting the latter out of engagement with the lug 185 of carriage 165.

The operation of the stock-supply unit 53 is as follows. As a drum 46 with four fabric plies thereon enters sector E, a latch 95 engages lug 185 of carriage 165 and moves the latter along with the turntable. Substantially concurrently the stud 119 of bracket 118 operates pilot valve 190 to discharge cylinder 182 so that the movement of the carriage is unimpeded. As the carriage 165, and supply rack thereon move with the turntable in radial alignment with a drum 46 thereon, operator #3 attaches the leading ends of chafer strips 149 and tread ply strip 149 to the tire structure on the drum, imparts one revolution to the drum to wind said strips thereabout, and then severs the strips on the drum from the supply thereof. The operator then actuates the automatic instrumentalities of the tire building machine that turn down the marginal portions of the chafer strips and overbead fabric plies, and fold them about the tire beads, which operations are completed in sector F. The movement of the carriage 165 with the turntable continues until a roller 101 lifts latch 95 out of engagement with lug 185 of said carriage. Immediately thereafter stud 119 of bracket 118 engages and operates pilot valve 191, with the result that cylinder 182 is charged, the piston rod 184 thereof is retracted, and the carriage 165 is returned to normal inoperative position.

After the chafer strips 147 have been turned under as described, each drum 46 comes into alignment with the stock-supply unit 54 in sector F, which supply unit carries tread slabs for tire construction, and is shown in detail in Figures 15 to 17. The supply unit 54 comprises a carriage 194 that is carried upon the trackway 56 and is movable therealong between a normal inoperative position, shown in full lines in Figure 7, and an alternative position shown in broken lines at 194a in said figure. Mounted upon the carriage 194 is an open frame 195 and upon the top of the latter is a work-support for two tread slabs 196, 196. The work-support is arranged to position the tread slabs in side-by-side relation with their longitudinal centerlines disposed radially of the axis of the turntable 21. For this reason the positions of the tread slabs converge toward the front of the supply unit. The arrangement provides more readily for keeping the stock unit supplied with tread slabs for the drums 46, the latter withdrawing tread slabs alternately from one side of the work-support and then from the other side, in a manner presently to be explained. Thus an operator is enabled to replenish one side of the unit as the tread slab is being withdrawn from the other side thereof.

The work support of the frame 195 comprises a relatively wide tray 198 that extends from the top thereof toward the turntable 21 and is disposed in overhanging relation to the drums 46 of the latter as said drums come into alignment with the unit. At the rear end of the tray 198 are a pair of anti-friction rollers 199, 199 over which the respective tread slabs are drawn as they move toward the front end of the tray, the axes of said rollers being at an angle to each other, but normal to the centerlines of the tread slabs 196. The front end of the tray 198 is similarly provided with a pair of rollers, such as the roller 200, which rollers are angularly disposed in the same manner as the rollers 199, and are parallel to the latter. The front end of the tray also carries a pair of bridge-like supports 201, 261 that span the course of the respective tread slabs 196, parallel to the respective rollers 200, each of said supports 201 carrying a pair of adjustable brackets 202, 202 upon which respective guide-discs 203 are journaled. The discs 203 of each pair of discs are disposed at an angle to each other, and are adapted to engage a tread slab 196 at the respective shoulders thereof each side of its medial region. The discs 203 thus serve to restrain the tread slabs 196 from lateral movement as they are moved longitudinally toward the forward or delivery end of the tray 196. Rearwardly of the guide rollers 199 the frame 195 carries a top plate 204 upon which the trailing end portions of the tread slabs 196 may rest, said plate being downwardly sloped from said guide rollers. Said top plate carries two sets of adjustable guide-rails 205, 205 arranged in pairs and adapted to engage the lateral margins of the respective tread slabs 196 to guide them in a radial direction with relation to the turntable 21.

As previously stated, the successive drums 46 withdraw tread slabs 196 from the stock-supply unit 54 first from one side thereof and then from the other side, such operations being effected while a tread slab is in radial alignment with the drum and the carriage 194 is being moved along its trackway 56 by the turntable 21. In order that successive drums 46 will be aligned with alternate tread slabs of the supply unit 54, the carriage 194 of the latter at its front margin is provided with two projecting lugs 208, 209, which lugs extend into the orbit of the latches 95 of the turntable 21 and are engageable by the latter to move the said carriage from the full line position shown in Figure 7 to the position shown in broken lines in said figure. The positions of the lugs 208, 209 correspond to the positions of the two tread slabs on the supply unit, and means is provided whereby successive latches 95 of the turntable engage alternate lugs 208, 209, and including means whereby the latches 95 are lifted out of engagement with said lugs at different points in their orbit according to which of the lugs it is engaged with, as presently will be described. Whichever lug, 208 or 209, a latch 95 engages, it will be disengaged from said lug as the carriage 194 reaches the broken line position 194a. In order to return the carriage 194 from the position 194a to the normal inoperative position shown in full lines, a single-acting fluid pressure operated cylinder 210 is provided, said cylinder being disposed below the carriage 194 and swiveled at its middle upon a floor bracket 211 that is located just beyond the broken line position 194a of the carriage. The cylinder 210 has a piston rod 212 projecting from the front end thereof, the outer end of the piston rod being pivotally connected to the carriage 194 on its under side. The cylinder is charged from the rear end thereof, to project the piston rod 212, through the agency of a supply pipe 213, and the admission of fluid to said pipe, and its discharge therefrom is controlled by a two-way, balanced, piston type valve 214 of the kind hereinbefore mentioned. Pressure fluid is supplied to the valve 214 through a pipe 215 that connects with the trunk supply pipe 126. Operation of valve 214 is effected by means of a plurality of bleeder or pilot valves of which pilot valve 216 is fixedly positioned in front of the normal inoperative position of the carriage 194 and in the orbit of studs 119 of the brackets 118, pilot valve 217 is movable and has an operative position in front of the broken line position 194a of the carriage in the orbit of the studs 120 of brackets 118, and pilot valve 218 is fixedly positioned somewhat beyond the broken line position of the carriage in the orbit of the studs 120 of the brackets 118. Pilot valve 216 controls the operation of valve 214 to effect the discharge of cylinder 210, and pilot valves 217 and 218 control the operation of valve 214 to effect the charging of cylinder 210. Because the valve 217 is movable, it is possible to move the same out of the orbits of the studs 120 on brackets 118, thus delaying the charging of the cylinder 210 until pilot valve 218 is operated, as presently will be explained.

The means for moving the pilot valve 217 out of the orbits of the studs on brackets 118 is combined with means for disengaging a latch 95 from lug 208 on carriage 194, said means being shown in detail in Figures 8 and 9. As shown in said figures, the pilot valve 217 is carried at the outer end of an angular arm 221, upon an angular seat 222 that is secured to said arm and which rests upon a metal slide-plate 223 that is set into the flooring. At its inner end the arm 221 is adjustably secured to a slide 224 that is slidably mounted upon a base plate 225 between lateral slideways 226, 226. The slide 224 is connected by a coupling 227 to the outer end of the piston rod 228 of a double-acting fluid pressure cylinder 229, also mounted on the base plate 225. The cylinder 229 has a fluid inlet-and-outlet pipe 230 communicating with the front end of its chamber, and has a fluid inlet-and-outlet pipe 231 communicating with the rear end of its chamber. Mounted upon the top of the slide 224 is a horizontal cam plate 232, the ends of which are downwardly curved as shown in Figure 8. The cam plate 232 is disposed transversely of the axis of the cylinder 229, which axis is disposed radially of the axis of the turntable 21 and in radial alignment with the lug 208 of carriage 194 when said carriage is in the broken line position 194a of Figure 7. The arrangement is such that when the rear end of cylinder 229 is charged, the piston rod 228 thereof is in projected position, the pilot valve 217 at the end of arm 221 is disposed in the orbit of the studs 120 of the brackets 118, and the cam plate 232 is in the orbit of the downward extensions 100 of the latches 95, which arrangement is shown in Figure 9 where a stud 120 and latch 95 are shown in operative engagement with said pilot valve and said latch. When the front end of the cylinder 229 is charged, the slide 224 is moved rearwardly to move the pilot valve 217 out of the orbits of the studs 119, 120 and to move the cam plate 232 out of the orbit of the extensions 100 of latches 95, the rearward or inoperative positions of valve 217 and cam plate 232 being indicated in broken lines in Figure 9. A roller 191 positioned beneath the turntable substantially in radial alignment with lug 209 of carriage 194, when the latter is in the broken line position 194a, is provided for lifting a latch 95 out of engagement with said lug, it being understood that at such times the cam plate 232 is in retracted, inoperative position.

As previously stated, successive latches 95 engage the lugs 208, 209 of carriage 194 in alternation, the arrangement being such that alternate latches 95 approaching alignment with lugs 208 are elevated for a short distance of their orbit so as to pass over the lug 208, the latch subsequently being lowered so as to engage lug 209 of the carriage. For effecting the lifting of alternate latches 95 as described, a double-acting fluid pressure cylinder 235, Figure 7, is provided, which cylinder is mounted on the floor below turntable 21 and substantially in radial alignment with said lug 208 in the inoperative, full line position of the carriage. The cylinder 235 is identical with cylinder 229 previously described, and like the latter, is adapted to effect radial movement of a slide upon which a cam plate 236 is mounted. The cam plate 236 is identical with cam plate 232, is movable into and out of the orbit of the extensions 100 of latches 95 for lifting alternate latches over lug 208. Fluid pressure is conducted to the front end of cylinder 235 by a fluid inlet-and-outlet pipe 237, and is conducted to the rear end of said cylinder by a fluid inlet-and-outlet pipe 238.

The charging and discharging of cylinders 229, 235 is controlled by a four-way, balanced, piston type valve 240 located between them and below the turntable 21. Pipe 230 of cylinder 229 and pipe 237 of cylinder 235 extend to the discharge ports of valve 240, and exteriorly of the latter pipe 231 of cylinder 229 connects with said pipe 237 and pipe 238 of cylinder 235 connects with pipe 230 of cylinder 229. The arrangement is such that when the front end of either cylinder 229, 235 is charged, the rear end of the other cylinder concurrently is charged. Pressure fluid for operating said cylinders is supplied to the valve 240 through a supply pipe 241 that has connection with the trunk supply pipe 126. Operation of the valve 240 is effected by two pilot valves 242, 243 that are disposed beneath the turntable 21 at different distances from the axis of the latter. Pilot valve 242 effects operation of valve 240 in a manner that results in the charging of the front end of cylinder 229 and the charging of the rear end of cylinder 235. Pilot valve 243 controls valve 240 to effect the charging of the front end of cylinder 235 and the charging of the rear end of cylinder 229. Operation of pilot valves 242, 243 is effected by means of operating fingers or studs 244 into the orbits of which said pilot valves extend, said studs being secured to the under side of turntable 21 and projecting downwardly therefrom. Successive studs 244 are spaced different distances from the axis of the turntable, the arrangement being such that they actuate pilot valve 242, 243 in alternation. There are the same number of studs 244 as there are tire building drums on the turntable, the studs being so positioned relatively of the tire building machines as to operate the pilot valves 242, 243 at the proper times with respect to the angular position of the turntable.

The operation of the apparatus in sector F is as follows, reference being directed especially to Figure 7 wherein it will be seen that in the last phase of the previous cycle of operation, the stud 120 on bracket 118 engaged pilot valve 217 to operate valve 214 and thus to charge cylinder 210, the latter returning the carriage 194 to the full line position shown. With the various elements in the positions shown, the first phase of operation will occur when a stud 244 operates pilot valve 242 and thus operates valve 240 to charge the front end of cylinder 229 and the rear end of cylinder 235, thus reversing said cylinders from the condition shown and causing retraction of pilot valve 217 and cam plate 232, and causing the cam plate 236 to be projected forwardly into the orbit of the extensions 100 of latches 95. Continued movement of the turntable brings a latch into engagement with the cam plate 236, said latch thereby being lifted, and is in elevated position as it passes lug 208 of carriage 194, thereby avoiding engagement with said lug. At this same time a stud 119 on a bracket 118 engages and operates pilot valve 216, thereby operating valve 214 to effect the discharge of cylinder 210. Continued rotation of the turntable then moves the previously elevated latch 95 into engagement with lug 209 of carriage 194, the latter, and supply rack 195 thereon then moving along with the turntable 21, a drum 46 on the turntable being aligned with one of the tread slabs 196 carried by said stock rack. An operator then attaches said tread slab to the tire structure on drum 46, and rotates the latter to draw the tread slab from its supply rack onto the drum. This operation is completed by the time the carriage 194 has been moved to the broken line position 194a. Upon reaching the latter position, the latch 95 engages roller 101 and is lifted thereby to release lug 209, and immediately thereafter stud 120 on bracket 118 engages pilot valve 218 to operate valve 214 to charge cylinder 210 and thus to restore carriage 194 to its original full line position. As the drum 46 with tread thereon moves out of sector F, an operator splices the ends of the tread slab thereon and sets into action the automatic instrumentalities that stitch down the tread to the tire structure on the drum, the stitching operation continuing through sector G. This completes one cycle of operations upon a drum passing through sector F.

As the succeeding drum enters sector F, a stud 244 engages and operates pilot valve 243, thus operating valve 240 in a manner that charges the rear end of cylinder 229 and the front end of cylinder 235, with the result that pilot valve 217 and cam plate 236 is retracted, which positions of said members are shown in Figure 7. Then the latch 95 engages lug 208 of carriage 194, thus bringing drum 46 into alignment with the other tread slab of the supply rack 195. Carriage 194 moves with the turntable 21 until latch 95 engages cam plate 232 and is lifted thereby out of engagement with said lug, the carriage then being in the broken line position 194a. Immediately thereafter pilot valve 217 is engaged by stud 120 of a bracket 118 to operate valve 214 in a manner that charges cylinder 210 and thus restores carriage 194 to the full line inoperative position shown, this operation being effected while the latch 95 still is engaged by cam plate 232 so that lug 209 may clear the latch as the carriage 194 is returned. This completes the alternative cycle of operation.

As previously stated, the building of a tire is completed in sector G with the stitching down of the tread slab of the tire. In sector H the drum is collapsed, the finished tire is removed therefrom, bead rings are mounted upon the bead setting instrumentalities of the tire building machine, and the drum is made ready for the building of another tire thereon prior to its entry again into sector A. Experience has proved that satisfactory results are obtained with the apparatus shown when the turntable makes one revolution in about five minutes.

It is believed that the operation of the apparatus as a whole will be understood from the foregoing description of the various parts thereof. The illustration and description of the specific tire building machines employed has been omitted for clearness of illustration, and because said machines are not a part of the present invention. The various automatically operating instrumentalities of the tire building machines are operated electrically and by fluid pressure, the turntable 21 carrying a trunk supply line 246 of fluid pressure, which supply line reaches the turntable 21 through the tubular quill 27 at the axis thereof. Branch pipes 247 connected to said trunk line extend through apertures 248 in the turntable to the respective tire building machines. Electrical energy for the tire building machines also may reach the latter through suitable conductor wires (not shown) that extend through said quill.

The invention makes it possible to maintain a large production of pneumatic tire casings with relatively few operators, which operators perform relatively few and simple operations in which they become highly skilled. The invention results in the reducing of the cost of tire casings, and achieves the other objects set out in the foregoing statement of objects.

Modification may be resorted to without departing from the spirit of the invention or the scope thereof as defined by the appended claims.

What is claimed is:

1. In apparatus of the character described, the combination of a tire building machine, a movable carrier supporting said machine and conveying it in an orbital course, a stock-supply unit disposed beside the carrier, said unit comprising a stationary stock rack and a movable stock rack, means for moving the movable stock rack with the carrier for a determinate distance while stock therefrom is withdrawn by the tire building machine, and means for returning said stock rack to its initial position, the stationary stock rack being positioned midway between the limits of movement of the movable rack and rearwardly thereof and adapted to feed stock to the latter in all positions thereof.

2. A combination as defined in claim 1 in which the stock in the movable rack is disposed in festoons, including drive means on the stationary rack for feeding material into said festoons intermittently as the latter are shortened by the withdrawal of material therefrom.

3. Apparatus for delivering tire stock to a tire building machine moving in an orbital course, said apparatus comprising a stationary stock rack for reels of tire building material, a movable stock rack having movement with the tire building machine for a determinate distance and retractive movement to point of starting, said stationary rack being disposed midway between the limits of movement of the movable rack and rearwardly thereof, drive means on the stationary rack for feeding stock therefrom to the movable rack, and means on said racks for so turning the stock as it passes therebetween that the movement of the racks relatively of each other flexes the stock passing therebetween at an angle to its own plane.

4. In apparatus of the character described, the combination of a plurality of tire building machines, a movable carrier supporting the same and conveying them in an orbital course, a movable stock-supply unit beside the carrier and comprising dual stock supplies arranged side by side, latches on the carrier associated with each tire building machine and adapted for engagement with the stock supply unit to move the same with the carrier while a tire building drum is aligned with one of the stock supplies, and means for causing successive latches to engage the stock-supply unit at different points along its structure whereby movement of the supply unit occurs as successive drums are aligned with alternate stock supplies of the unit.

5. In apparatus of the character described, the combination of a plurality of tire building machines, a movable carrier supporting the same and conveying them in an orbital course, a movable stock-supply unit beside the carrier and comprising dual stock supplies arranged side by side thereon, latches on the carrier associated with the respective tire building machines adapted for engagement with the stock-supply unit to move the same with the carrier while a tire building drum is aligned with one of the stock supplies thereon, means for causing successive latches to engage the stock-supply unit at different points along its structure whereby movement of the supply unit occurs as successive drums are aligned with alternate stock supplies of the unit, and means for disengaging successive latches from the stock-supply unit at different points in the travel of the latches so that the stock-supply unit always is disengaged from the carrier at the same point of movement of the unit.

6. In apparatus of the character described, the combination of a tire building machine, a movable carrier supporting the same and conveying it in an orbital course, a movable stock-supply unit beside the carrier and comprising dual stock supplies arranged side by side thereon, a latch on the carrier determinately positioned with relation to the tire building machine, lugs associated with the respective stock supplies projecting from the stock-supply unit into the path of said latch, and means for momentarily moving the latch relatively of the carrier and out of its normal orbit so that it will avoid engagement with the first lug on the supply unit, and engage the second lug thereon.

7. In apparatus of the character described, the combination of a plurality of tire building machines, a turntable supporting the same and moving them in an orbital course, a movable stock-supply unit beside the turntable and comprising duel stock supplies arranged side by side thereon, latches on the turntable at the perimeter thereof in determinate position with relation to the respective drums of the tire building machines, lugs associated with the respective stock supplies projecting from the stock-supply unit into the normal orbit of said latches, and means for moving alternate latches momentarily out of the plane of their orbit to avoid engagement with the first lug of the stock-supply unit but to engage the second lug thereof, whereby the supply unit is moved with the turntable as successive drums are aligned with alternate stock supplies of the supply unit.

8. A combination as defined in claim 7 in which the means for moving the alternate latches out of their normal orbit is a cam-plate, including means for moving the cam plate into and out of operative relation with the latches.

9. In apparatus of the character described, the combination of a plurality of tire building machines, a turntable supporting the same and moving them in an orbital course, a movable stock-supply unit beside the turntable and comprising dual stock supplies arranged side by side thereon, latches on the turntable at the perimeter thereof in determinate relation to the respective drums of the tire building machines, lugs associated with the respective stock supplies projecting from the stock supply unit into the normal orbit of said latches, means for moving alternate latches momentarily out of the normal plane of their orbit to avoid engagement with the first lug of the stock-supply unit but to engage the second lug thereof, whereby the supply unit is moved with the turntable as successive drums are aligned with alternate stock supplies of the supply unit, and means for disengaging the latches from the lugs at different points in the orbit of the latches, according to which lug of the supply unit is engaged by a latch.

10. A combination as defined in claim 9 in which the means for disengaging the latches from the lugs of the stock supply unit consists of a member having a fixed situs in the orbit of the latches for disengaging a latch from one of the lugs, and a movable member having alternative positions in one of which it is disposed in the orbit of the latches to disengage the latch from the other lug.

11. In apparatus of the character described, the combination of a turntable, a plurality of tire building machines thereon, a movable stock-supply unit beside the turntable and comprising dual stock supplies arranged side by side thereon, latches on the turntable at the perimeter thereof in determinate relation to the drums of the tire building machines, lugs associated with the respective stock supplies projecting from the stock supply unit into the normal orbit of said latches, a cam-plate movable into the orbit of the latches to lift a latch momentarily out of its normal plane so as to avoid the first lug of the stock-supply unit but to engage the second lug thereon, means for disengaging the latches from the lugs at different points in the orbit of the latches according to which lug of the supply unit is engaged, said disengaging means comprising a cam-plate movable into and out of the orbit of the latches, and control means for concurrently operating said cam-plates to move one of them into the orbit of the latches while retracting the other therefrom.

12. A combination as defined in claim 11 in which the control means comprises fluid-pressure operated cylinders for operating the respective cam-plates, valve means common to said cylinders for operating the same, a pair of pilot valves for operating said valve to reverse said cylinders, and means carried by the turntable for operating said pilot valves in alternation.

13. In apparatus of the character described, the combination of a turntable, a plurality of tire building drums thereon, a movable stock-supply unit beside the turntable and comprising dual stock supplies arranged side by side thereon, latches on the turntable, lugs associated with the respective stock supplies projecting from the stock-supply unit into the normal orbit of said latches, means for causing successive latches to engage alternate lugs of the stock supply unit, to move the latter with the turntable, means for disengaging the latches from the lugs at different points in the orbit of the latches according to which lug of the supply unit is engaged by a latch, a fluid pressure operated cylinder for returning the supply unit to point of starting after the propelling latch is disengaged therefrom, and alternative means for operating said cylinder according to which latch-disengaging means last functioned.

14. A combination as defined in claim 13 in which the alternative means for operating the fluid pressure cylinder comprises a control valve, a pair of pilot valves for operating the same, means carried by the turntable for operating said pilot valves, and means for moving one of said pilot valves into and out of the orbit of the pilot-valve-operating means.

15. In apparatus of the character described, the combination of a turntable, a plurality of tire building machines thereon, a movable stock-supply unit beside the turntable and comprising dual stock supplies arranged side by side thereon, latches on the turntable at the perimeter thereof, lugs associated with the respective stock supplies projecting from the stock-supply unit into the normal orbit of said latches, means for moving alternate latches momentarily out of the normal plane of their orbit to avoid engagement with the first lug of the stock-supply unit but to engage the second lug thereof, means disengaging the latches from the lugs at different points in the orbit of the latches, the means for disengaging latches from the first lug of the supply unit comprising a cam plate structure that includes a cam plate and means for moving the latter into and out of the orbit of the latches, a fluid pressure cylinder for returning the supply unit to point of starting after the propelling latch is disengaged therefrom, and alternative means for operating said cylinder according to which latch-disengaging means last function, said means comprising a control valve for said cylinder, a pair of spaced apart pilot valves for operating the same, a stud carried by the turntable and engageable with said pilot valves, and a seat for one of said pilot valves connected to the cam plate structure whereby said pilot valve is moved out of the orbit of said stud when said cam plate is moved out of the orbit of the latches.

16. In apparatus for tire production, the combination of a tire-building machine, a movable carrier supporting said machine and conveying the same in an orbital course, a movable stock-supply unit disposed beside the carrier, means on the carrier engageable with said stock-supply unit for moving the same with the carrier, in alignment with said tire-building machine thereon, means disengaging the supply unit from the carrier after both have moved a determinate distance together, a fluid pressure operated cylinder operatively connected to the stock-supply unit for returning the same to point of starting after disengagement from the carrier, and means for charging and discharging the fluid pressure cylinder in determinate time relation to the moving of the supply unit by the carrier, which means comprises a valve movable to alternative positions, and means on the carrier for moving said valve in alternation to said positions.

17. In apparatus for tire production, the combination of a tire-building machine, a movable carrier supporting said machine and conveying the same in an orbital course, a movable stock-supply unit disposed beside the carrier, means on the carrier engageable with the stock-supply unit for moving the same with the carrier, in alignment with said tire-building machine thereon, means disengaging the supply unit from the carrier after both have moved a determinate distance together, a fluid pressure operated cylinder operatively connected to the stock-supply unit for returning the same to point of starting after disengagement from the carrier, and means for charging and discharging the fluid pressure cylinder in determinate time relation to the moving of the supply unit by the carrier, which means comprises a balanced piston-type valve, spaced-apart pilot valves for operating the same, and means carried by the carrier for operating said pilot valves in succession.

HORACE D. STEVENS.

CERTIFICATE OF CORRECTION.

Patent No. 2,324,985.                                            July 20, 1943.

HORACE D. STEVENS.

It is hereby certified that error appears in the printed specification of the above numbered patent requiring correction as follows: Page 2, second column, line 70, after "strip" insert --in unit--; page 3, second column, line 33, for "from" read --for--; page 7, first column, line 10, strike out "open" second occurrence; page 8, second column, line 69, for "lugs" read --lug--; page 11, second column, line 24, for "function" read --functioned--; and that the said Letters Patent should be read with this cortion therein that the same may conform to the record of the case in the Patent Office.

Signed and sealed this 14th day of September, A. D. 1943.

(Seal)                                         Henry Van Arsdale,
                                            Acting Commissioner of Patents.